United States Patent [19]
Okuno et al.

[11] Patent Number: 5,905,628
[45] Date of Patent: May 18, 1999

[54] METALLIZED FILM CAPACITOR

[75] Inventors: Shigeo Okuno; Toshiyuki Nishimori; Shigeo Okabe, all of Toyama; Masahiro Kawai, Tonami; Nobuji Suzuki, Takaoka; Hidekazu Wada, Tonami, all of Japan

[73] Assignee: Matsushita Electric Industrial Co., Ltd., Osaka, Japan

[21] Appl. No.: 08/907,902

[22] Filed: Aug. 11, 1997

[30] Foreign Application Priority Data

Aug. 9, 1996 [JP] Japan .................................. 8-210952
Nov. 8, 1996 [JP] Japan .................................. 8-296090

[51] Int. Cl.⁶ ......................... H01G 4/005; H01G 4/008
[52] U.S. Cl. ......................... 361/303; 361/311; 361/305; 29/25.42
[58] Field of Search ...................... 29/25.42; 361/301.4, 361/301.5, 303, 305, 306.1, 306.2, 306.3, 309, 311, 312, 313, 315, 314, 318, 319, 321.5, 273

[56] References Cited

U.S. PATENT DOCUMENTS

| | | | |
|---|---|---|---|
| 3,298,864 | 1/1967 | Maylandt | 361/273 |
| 5,051,862 | 9/1991 | Pageaud et al. | 361/308 |
| 5,615,078 | 3/1997 | Hudis et al. | 361/313 |
| 5,696,663 | 12/1997 | Unami et al. | 361/305 |

FOREIGN PATENT DOCUMENTS

| | | |
|---|---|---|
| 57-152122 | 9/1982 | Japan . |
| 4-225508 | 8/1992 | Japan . |
| 4-346652 | 12/1992 | Japan . |
| 5-158271 | 6/1994 | Japan . |
| 8-31690 | 2/1996 | Japan . |

*Primary Examiner*—Kristine Kincaid
*Assistant Examiner*—Anthony Dinkins
*Attorney, Agent, or Firm*—Pearne, Gordon, McCoy & Granger LLP

[57] ABSTRACT

A metallized film capacitor formed by laminating or winding a metallized film 1 with metal evaporated electrode on one or both sides thereof so that a pair of metal evaporated electrodes 2 are opposite to each other, wherein electrode lead-out portions 3 are provided at both ends of the capacitor, each metal evaporated electrode is composed of a low resistance area abutting on the electrode lead-out portion and a remaining high resistance area having higher resistance than it, a split electrode pattern with a plurality of minute blocks 8 formed in a longitudinal direction and width direction and fusing areas 9 between the adjacent minute blocks is formed on at least one of the metal evaporated electrodes, and electrode partitioning lines 7 are formed at regular intervals in a longitudinal direction of the film. The metallized film is fabricated by depositing substance such as oil for preventing evaporation of metal on the evaporation side of a plastic film 10 through a rotary screen cylinder with any pattern formed by mesh processing and immediately thereafter depositing evaporated metal, thereby forming a split fuse pattern serving as a safeguard mechanism during high speed evaporation.

3 Claims, 8 Drawing Sheets

METALLIZED FILM CAPACITOR

BACKGROUND OF THE INVENTION

1. Field of the Invention

The present invention relates to a metallized film capacitor for improving power factor, an electric appliance, several kinds of power source circuit and communication device, a device and method for fabricating a metallized film used for the metallize film capacitor.

2. Description of the Related Art

Conventionally, a capacitor equipped with a fusing mechanism by minute division of evaporated metallized film or using the metallized film is disclosed in Japanese Patent Unexamined Publication Nos. Hei 4-225508, Hei 8-31690, etc. Therefore, it is possible to fabricate a metallized film capacitor equipped with the fusing mechanism.

Figure 13:
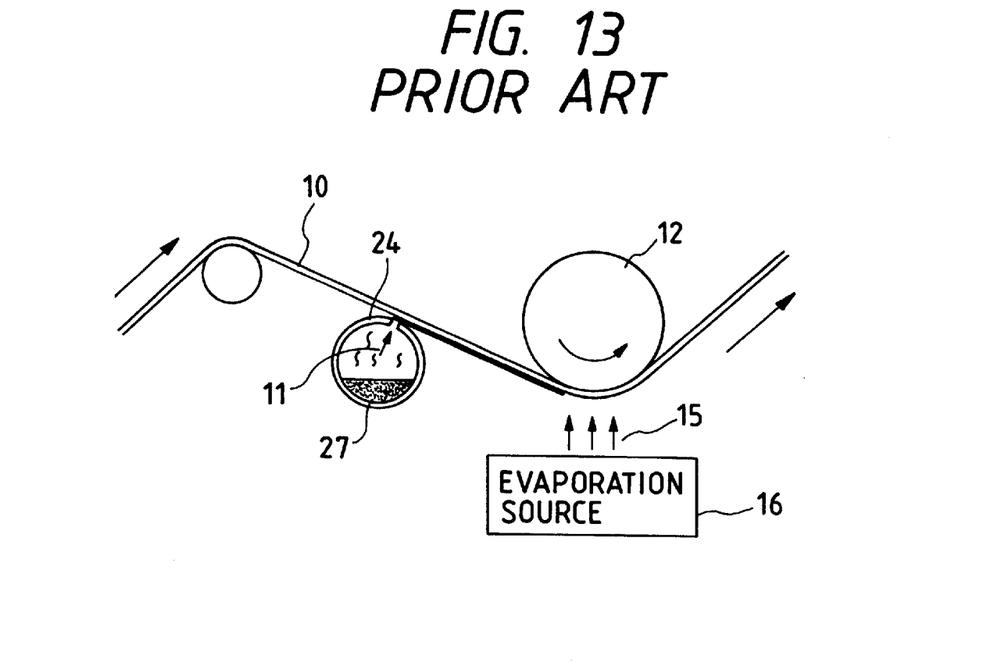
FIG. 13 is a view explaining a first conventional fabricating device for a metallized film.
Figure 16:
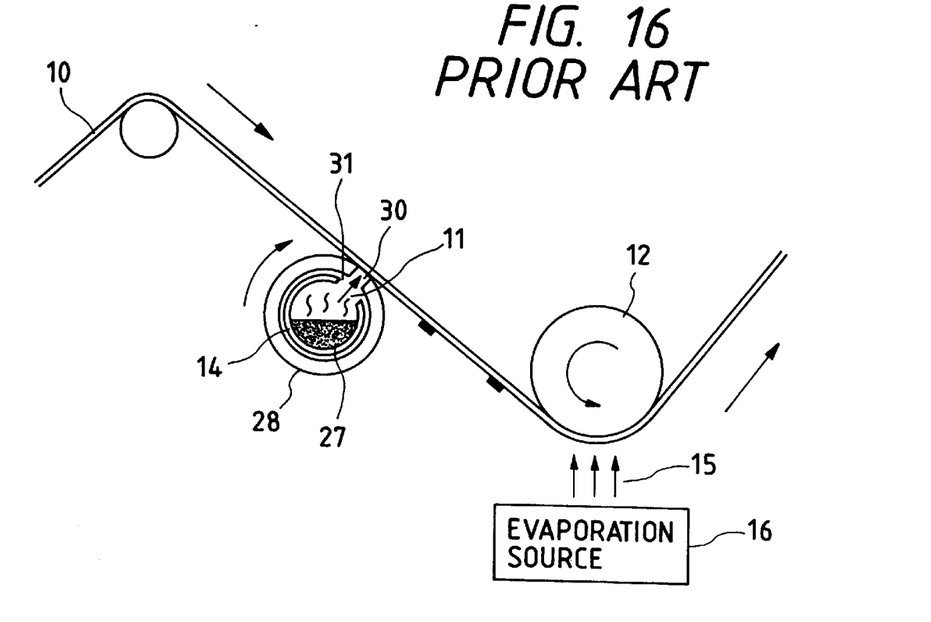
FIG. 16 is a view explaining a fourth conventional metallized film for a metallized film.

A previously known method of fabricating a metallized film for a capacitor is shown in FIG. 13. In this method, as shown in FIG. 16, immediately before an evaporated metal 15 is evaporated, in a vacuum evaporator, on a plastic film 10 (high polymer film) at a position where the film is brought into contact with a cooling roll 12, it is passed through an oil depositing device so that a plurality of divided margins serving as a safeguard mechanism is formed in a longitudinal direction of the plastic film (Japanese Patent Unexamined Publication No. Hei 57-152122). The apparatus used for this purpose includes an oil tank 14 that contains oil 27 therein and a shutter 28 rotating around the oil tank 14. The oil 27 within the oil tank 14 is heated and vaporized. When an opening 31 of the oil tank 14 and another opening 30 of the rotating shutter 28 coincide with each other, the oil passes through the openings 31 and 30 to be deposited on the plastic film 10. In this case, since the rotating shutter 28 rotates in synchronism with the supplying speed of the plastic film 10, the oil 27 can be deposited on the plastic tape at regular widths and intervals.

Figure 14:
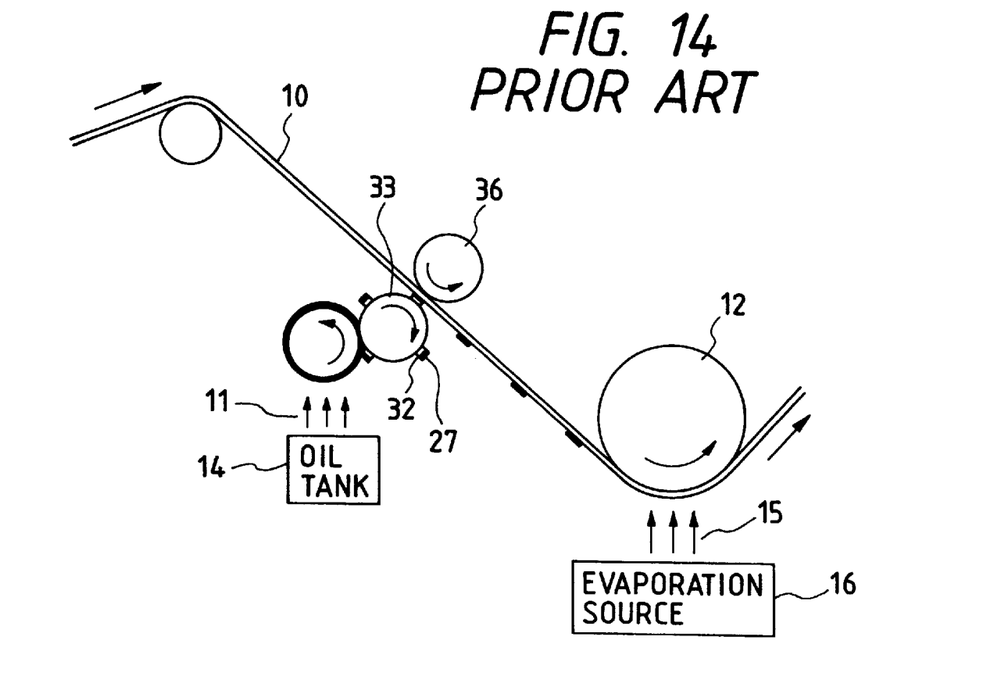
FIG. 14 is a view explaining a second conventional fabricating device for a metallized film.
Figure 15:
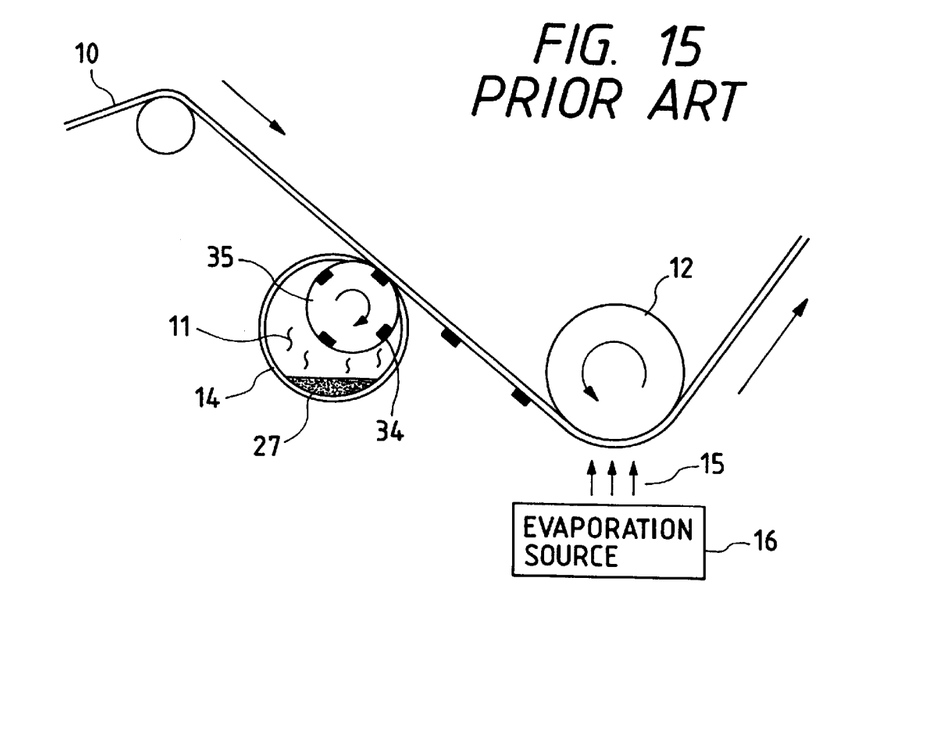
FIG. 15 is a view explaining a third conventional fabricating device for a metallized film.

Another previously known method for fabricating a metallized film is shown in FIG. 14. In this method, a convex type roll 33 with protrusions 32 formed on its circumference at given positions is used. A metal evaporation preventing substance (e.g. oil) 27 deposited on the surface of the protrusions 32 are transferred onto a plastic film 10 to form non-evaporated portions (Japanese Patent Unexamined Publication No. Hei 6-158271) thereon. Still another previously known method for fabricating a metallized film is shown in FIG. 15. In this method, using a concave type roll 35 with grooves 34 formed on its circumference, a metal evaporation preventing substance (e.g. oil) deposited on the surface of the grooves 34 are transferred onto the plastic film 10 to form non-evaporated portions thereon (Japanese Patent Unexamined Publication No. Hei 4-346652).

Figure 11:
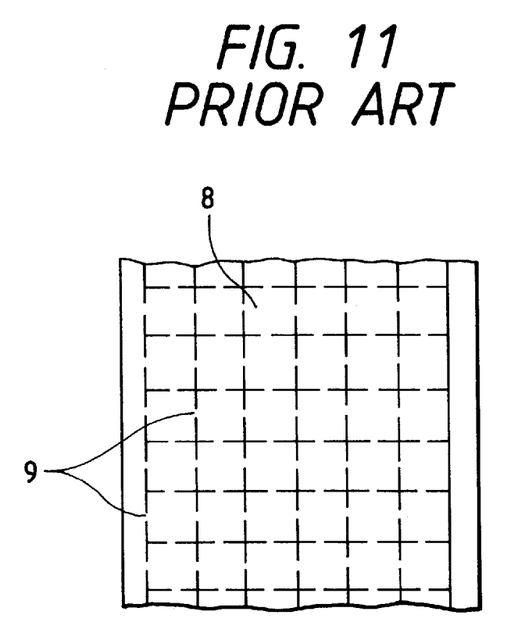
FIG. 11 is a partial plan view of the one metallized film according to a second prior art.

A further previously known method for fabricating a metallized film is shown in FIG. 11. In this method, in an evaporation step, margins of a tape at regular widths and intervals are evaporated in a direction parallel in the longitudinal direction of the tape by the oil masking technique and-tape margin technique, and in a post step, a plurality of divided electrodes and fuse portions are formed in the longitudinal direction by laser trimming and discharge machining.

The metallized film capacitor fabricated by the methods as described above suffers from several problems. In a configuration shown in FIG. 11 in which a metallized electrode is divided into plural minute blocks 8 and fuse areas 9 are arranged between the blocks, where minute breakage which cannot be cleared by self-recovery occurs, an excessive short-circuiting current flows so that the pertinent fuse area 9 operates to separate the broken portion from the metallized film capacitor. But since its area is minute, the current circulating from between the adjacent minute blocks causes the fuse area therebetween to be also operated, thus reducing the capacitance of an non-problematic portion.

Further, where the fuse area 9 does not operate by the short-circuiting current by clearing the minute breakage, the breakage at the block continues to lead to dielectric breakdown. Further, the breakage might spread toward the surrounding blocks. In the worst case, the metallized film capacitor might catch smoke or fire.

Figure 12:
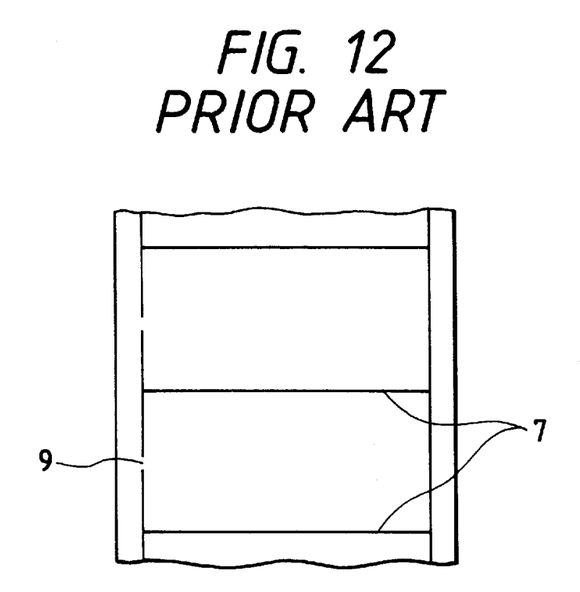
FIG. 12 is a partial plan view of the one metallized film with a different electrode pattern according to a first prior art.

Further, as shown in FIG. 12, in the metallized film capacitor equipped with a safeguard mechanism, in many cases, in order to improve the contact force between a metal sprayed area serving as an electrode lead-out portion and a metallized film, the thickness of an evaporating film at the metal sprayed area side is made thicker whereas that of the remaining portion is made thinner. At least one of the evaporating films is divided by electrode partitioning lines 7 to form the fuse area 9. In this case, the safeguard mechanism, when the breakage that cannot be cleared by self-recovery which is inherent to a film capacitor occurs, serves to operate the fuse area 9 using the Joule heat of the short-circuiting current for clearing the broken portion. But, where the breakage which cannot be cleared because of the thick film evaporated in the metal sprayed area, which requires higher energy for its clearing than the remaining portion does, the short-circuiting current continue to flow. Thus, the dielectric breakdown might occurs at the thick evaporated film.

However, the techniques for forming the non-evaporated portion suffer from several problems to be solved.

Where the metallized film capacitor with the safeguard mechanism is to be fabricated using the rotary shutter 28 as shown in FIGS. 13 and 16, as the case may be, in view of the property of a capacitor, the electrode of the evaporated film must be not only divided in plural blocks in a longitudinal direction of the plastic film, but also a square non-metallic island (fuse area) must be simultaneously formed in each of the divided electrode blocks. In this case, when the divided blocks and fuse areas are to be formed using the rotary shutter 28, only the slender fuse areas in the width direction of the film serve as relay portions of the rotary shutter 28. When the evaporation is carried out at a high speed, therefore, the rotary shutter 28 is apt to be deformed and the divided blocks and fuse areas are likely to be unclear. For this reason, the speed of evaporation could not be increased. Further, if a means is adopted which uses a difficult-to-deform substance for preventing the rotary shutter 28 from being deformed and increase the thickness, workability is deteriorated because of the problem of weight. In addition, in this case, the margin in a longitudinal direction must be formed at a separate portion by the oil masking method and tape margin technique. The adjustment required therefor might deteriorate the workability further greatly.

The technique using the convex type roll 33 as shown in FIG. 14 provides the following problem-occurs. When the metal evaporation preventing substance (e.g. oil) 27 is deposited to the protrusions 32 to form the non-evaporated margin, i.e. island-like divided electrode are formed in the longitudinal direction of the plastic film 10 and provide the electrodes with a fusing function, because of the centrifugal force of the convex type roll 33, the oil 27 scatters to provide a spot-like evaporated film and blur of the margin. This make it impossible to increase the evaporation speed.

The technique using the concave type roll 35 permits the evaporation speed to be increased. However, this technique has disadvantages that the cost of the concave type roll (pattern roll) 35 is expensive, and attachment/detachment of the concave type roll 35 in exchange is difficult owing to the problem of weight.

The technique shown in FIG. 13, in which in an evaporation step, margins are evaporated at regular widths and intervals in a direction parallel in the longitudinal direction of the tape and in a post step, a plurality of divided electrodes and fuse areas are formed in the longitudinal direction by laser trimming and discharge machining, provides economical and time loss because of an additional one step as compared with the other techniques.

SUMMARY OF THE INVENTION

The present invention has been made to solve the above problems, and an object of the invention is to provide a metallized film capacitor that improves in characteristic.

Another object of the invention is to provide an apparatus and method for fabricating a metallized film used for the metallized film capacitor, which is capable of applying oil for preventing evaporation of evaporated metal at a high speed and sufficiently.

In order to attain the above object, according to a first aspect of the invention, there is provided a metallized film capacitor which is formed by laminating or winding a metallized film with metal evaporated electrode on one or both sides thereof so that a pair of metal evaporated electrodes are opposite to each other, wherein electrode lead-out portions are provided at both ends of the capacitor, each metal evaporated electrode is composed of a low resistance area abutting on the electrode lead-out portion and a remaining high resistance area having higher resistance than it, a split electrode pattern with a plurality of minute blocks formed in a longitudinal direction and width direction and fusing areas between the adjacent minute blocks is formed on at least one of the metal evaporated electrodes, and electrode partitioning lines are formed at regular intervals in a longitudinal direction of a film.

In the second metallized film capacitor according to a second aspect of the invention, in addition to the first aspect, the area of each of the minute blocks in said low resistance film area is smaller than that in the high resistance area.

In the metallized film capacitor according to a third aspect of the present invention, in addition to the second aspect, the evaporated metal is made of zinc or zinc/aluminum alloy.

The device for fabricating a metallized film capacitor according to a fourth aspect of the present invention comprises means for vaporizing a metal evaporation preventing agent preventing evaporated metal from being evaporated on a film and a screen with an evaporated pattern, wherein a vaporized metal evaporation preventing agent is deposited directly on film through said screen.

In the device for fabricating a metallized film capacitor according to a fifth aspect of the present invention, said screen is a mesh having openings.

In the device for fabricating a metallized film according to a sixth aspect of the present invention, each of the openings of the mesh has a diameter of 10 μm to 1 mm.

The device for fabricating a metallized film according to a seventh aspect of the present invention comprises temperature-holding means for holding the vaporized state of said metal evaporation preventing agent until it reaches the film.

The device for fabricating a metallized film according to an eighth aspect of the present invention comprises means for driving the screen at a speed in synchronism with the shifting speed of the film.

In the device for fabricating a metallized film according to a ninth aspect of the present invention, said screen is cylindrical.

In the device for fabricating a metallized film according to a tenth aspect of the present invention, said film is shifted along a cylindrical face.

The device for fabricating a metallized film according to an eleventh aspect of the present invention comprises distance adjusting means for adjusting a distance between said screen and a discharging opening of said metal evaporation preventing agent.

The device for fabricating a metallized film according to a twelfth aspect of the present invention, comprises an impression cylinder roll for defining the passage of said film oppositely to said screen with respect said film.

In the device for fabricating a metallized film according to a thirteenth aspect of the present invention, said film is shifted along the curve of an impression roll.

The device for fabricating a metallized film according to a fourteenth aspect of the present invention comprises means for adjusting the distance between said impression cylindrical roll and said screen.

In the device for fabricating a metallized film according to a fifteenth means of the present invention, a deposited pattern of said screen has a split margin and fuse area which constitute a safeguard mechanism.

A method of fabricating a metallized film capacitor according to the present invention comprises a first step of vaporizing a metal evaporation preventing agent for preventing evaporated metal from being evaporated on a film; a second step of depositing said vaporized metal evaporation preventing agent vaporized by said vaporizing means directly on said film through a screen to a clear pattern on a margin at a high speed; and a third step of depositing said evaporated metal on said film.

In the configuration described above, in the metallized film capacitor according to the first aspect of the present invention, a split electrode pattern with a plurality of minute blocks formed in a longitudinal direction and width direction and fusing areas between the adjacent minute blocks is formed on one metal evaporated electrode, and electrode partitioning lines are formed at regular intervals in a longitudinal direction of a film. For this reason, where minute breakage which cannot be cleared by self-recovery occurs in a plurality of minute blocks, reduction in capacitance resulting when the current flowing from between adjacent minute blocks operates the non-problematic fusing area between the blocks can be suppressed. Also where the fusing area does not operate because of the short-circuiting current due to clearing of minute breakage, breakage in the capacitor can be prevented which results from the breakage at the block continuing to lead to dielectric breakdown and to spread toward the surrounding blocks.

Further, the metallized film according to the second aspect of the present invention, in addition to the first aspect, has improved the clearing of the minute broken area because the minute block in the low resistance film area abutting on the electrode lead-out portion has a smaller area than the other portion, thereby improving the operability of the fusing portion. For this reason, as regards the breakage which cannot be cleared when the evaporated film on the side of the flame sprayed potion, the short-circuiting current continues to flow to prevent the dielectric breakage from occurring at the thick portion of the evaporated film.

The film capacitor according to the third aspect of the present invention, in addition to the second aspect, uses zinc or zinc/aluminum alloy as the evaporated metal. For this reason, using the metal characteristic of these metal which does not require larger energy to perform clearing in minute breakage than a single element of aluminum which is mainstream of the metallized film capacitor at present, higher potential or miniaturization of the metallized film capacitor can be realized than the aluminum evaporated capacitor.

The above and other objects and features of the present invention will be more apparent from the following description taken in conjunction with the accompanying drawings.

DETAILED DESCRIPTION OF THE PREFERRED EMBODIMENTS

Hereinafter, a description will be given in more details of preferred embodiments of the present invention with reference to the accompanying drawings.

Now referring to FIGS. 1 to 5, an explanation will be given of an embodiment of the present invention.

Figure 4:
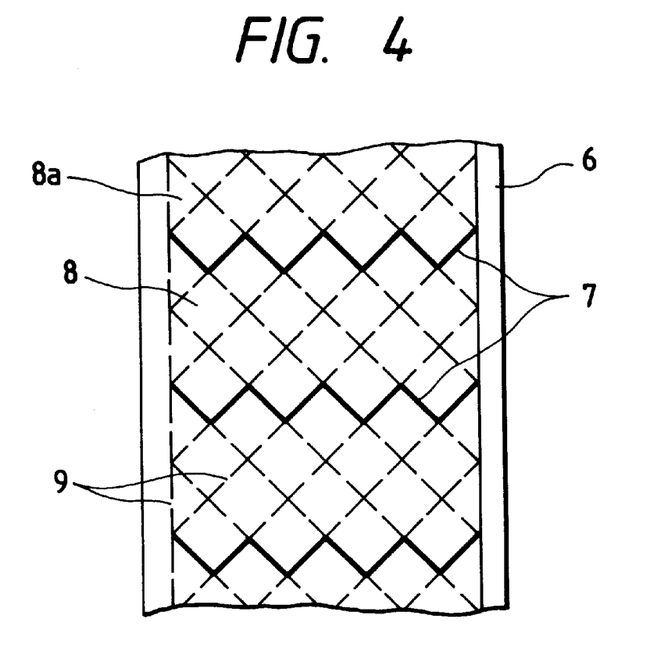
FIG. 4 is a partial plan view with another split electrode pattern according to the embodiment.
Figure 5:
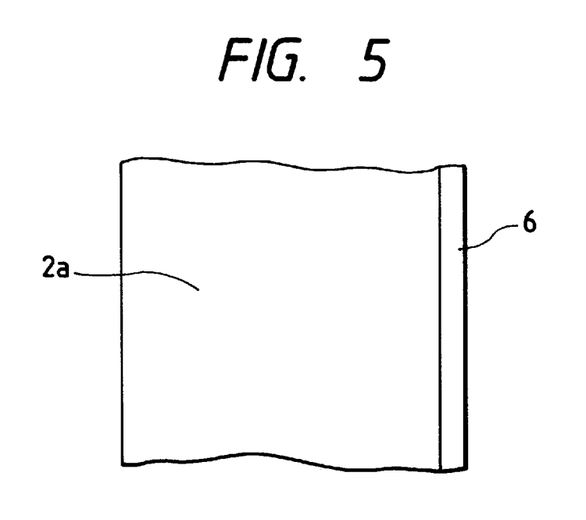
FIG. 5 is a partial plan view of the other metallized film according to the embodiment.

Reference numeral 1 denotes a dielectric film of a plastic film. Reference numeral 2 denotes a metal evaporated electrode in which an alloy of zinc and aluminum is deposited on a mesh-like divided electrode pattern shown in FIGS. 2, 3 or 4 using a continuous vacuum evaporator. Reference numeral 2a denotes a metal evaporated electrode having no divided electrode pattern as shown in FIG. 5. Reference numeral 3 denotes one of electrode lead-out portions metal-frame sprayed on both ends of the capacitor formed by laminating or winding a pair of the metallized film having the divided electrode pattern and the metallized film having no divided electrode pattern. Reference numeral 4 denotes one of the low resistance areas of the evaporated electrodes 2, 2a which have lower resistance than the remaining areas and abut on the electrode lead-out portions 3. Reference numeral 5 denotes one of high resistance film areas of the evaporated electrodes 2 and 2a. Reference numeral 6 denotes one of electrode margins formed at one ends of the high resistance film areas 5. Reference numeral 7 denotes one of electrode partitioning lines each of which partitions the metal evaporated electrode 2 at regular intervals in the longitudinal direction of the film. The electrode partitioning lines 7 may a straight line (FIGS. 2 and 3) or saw-tooth polygonal line.

Figure 1:
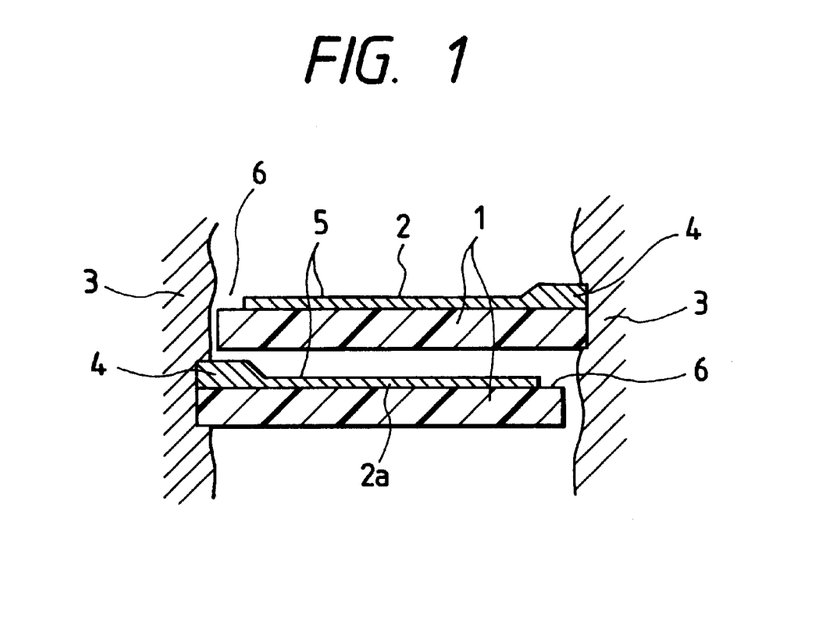
FIG. 1 is a sectional schematic view of a metallized film capacitor according to an embodiment of the present invention.
Figure 2:
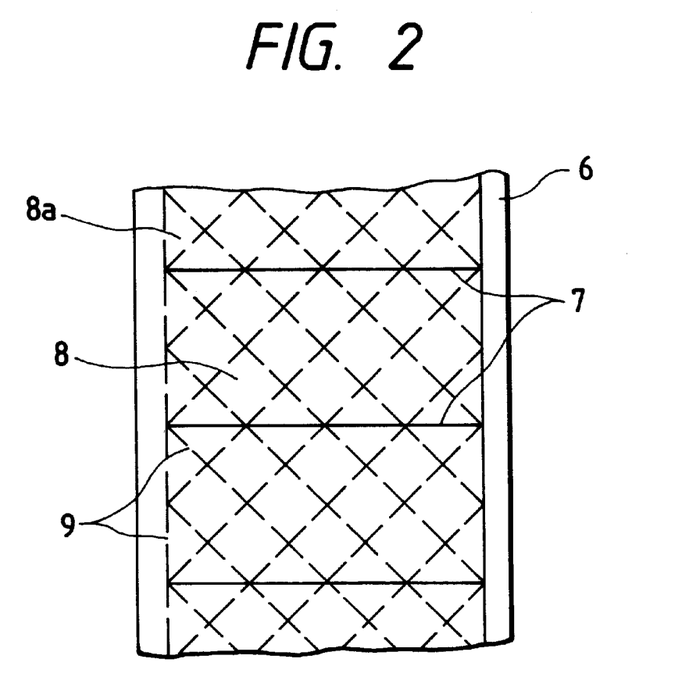
FIG. 2 is a partial plan view of the one metallized film according to the embodiment.
Figure 3:
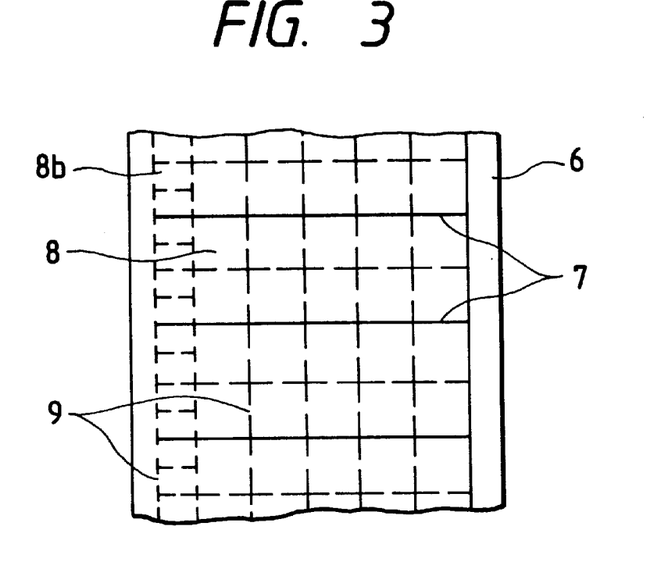
FIG. 3 is a partial plan view with a different split electrode pattern according to the embodiment.

Reference numeral 8 denotes one of minute blocks of the mesh-like divided electrode pattern of the metal evaporated electrode 2. These blocks are plural areas formed in the longitudinal and width directions of the film through fuse areas.

Reference numerals 8a and 8b are minute blocks adjacent to the electrode lead-out portions 3. The minute blocks 8a and 8b, the area of each of which is smaller than that of each of the minute blocks 8, promotes clearing of minute broken areas and improves the operation of the fuse areas 9.

In this way, the metallized film capacitor according this embodiment includes a metallized film with the metal evaporated electrode 2 divided into minute blocks 8 in the longitudinal and width directions, fuse areas 9 formed between the adjacent minute blocks and electrode partitioning lines 7 formed at regular intervals in the longitudinal direction of the film 1; and another metallized film with the metallized evaporated electrode 2a with no minute blocks and partitioning lines. It should be noted that a pair of metallized films 2 let and 2a both with the metal evaporated electrodes each divided into plural minute blocks 8 may be laminated or wound to form a metallized film capacitor.

In this embodiment, the minute blocks 8a, 8b of the low resistance film area 4 in contact with the electrode lead-out portion 3, each of which has a smaller area than that of the remaining high resistance area 5, can promote the clearing of the minute broken portion and improve the operation of the fuse area 9.

In the embodiment, the metal evaporated electrodes 2, 2a are made of zinc or zinc/aluminum alloy. For this reason, using the metal characteristic of these metal which does not require larger energy to perform clearing in minute breakage than a single element of aluminum which is mainstream of the metallized film capacitor at present, higher potential or miniaturization of the metallized film capacitor can be realized than the aluminum evaporated capacitor.

The fourth fabricating device for a metallized film according to the present invention deposits a vaporized metal evaporation preventing agent directly on film through a screen to a clear pattern on a margin at a high speed.

The fifth fabricating device for a metallized film can hold the strength of the screen to prevent the distortion when the screen is rotated.

The six fabricating device for a metallized film can from a pattern with no clogging accurately.

The seventh fabricating device for a metallized film can hold the vaporized state of a metal evaporation preventing agent until it reaches a film, thereby forming a clear pattern.

The eighth fabricating device for a metallized film makes the shifting speeds of a screen and a film synchronous with each other so that the displacement or blue of the pattern can be suppressed.

The ninth fabricating device for a metallized film, in which a screen is cylindrical, can easily the screen and will not injure the film.

The tenth fabricating device for a metallized film shifts the film along a cylindrical face so that the contact between a screen and a film can be held without using a specific means for holding the film.

The eleventh fabricating device for a metallized film can provide a distance between an optimum screen and a discharging opening of a metal evaporation preventing agent in accordance with the kind of oil to be used, shifting speed, kind of a pattern, etc.

The twelfth fabricating device for a metallized film can prevent the chattering of a film by an impression cylinder roll, thereby forming a pattern accurately.

The thirteenth fabricating device for a metallized film can shift a film along the impression cylinder roll so that the film is brought into contact with the impression roll, thereby keeping the distance between the screen and film.

The fourteenth fabricating device for a metallized film adjusts the distance between the impression cylinder roll and the screen so that the distance between the screen and the film can be adjusted.

The fifteenth fabricating device for a metallized film can form a split margin and fuse area with no succeeding step.

The method of fabricating a metallized film deposits the vaporized metal evaporation preventing agent the fourth fabricating device for a metallized film directly on a film through a screen to a clear pattern on a margin at a high speed.

Embodiment 1

With reference to concrete numerical values, a detailed explanation will be given of embodiments of the present invention. As an example No. 1, using a continuous vacuum evaporator, an alloy of zinc and aluminum was evaporated on a polypropylene film having a thickness of 6 µm. With the evaporated film having resistance of 2–8Ω/$^H_T$ at the metal-frame spraying area and of 10–30Ω/$^H_T$, a winding capacitor was fabricated which has a pair of metallized films with the divided electrode pattern (FIG. 2) and with no divided electrode pattern (FIG. 5). Likewise, as an example No. 2, another winding capacitor was fabricated which has a pair of metallized films with the divided electrode pattern (FIG. 3) and with no divided electrode pattern (FIG. 5). For comparison, prior art winding capacitors 1 (FIG. 12) and 2 (FIG. 11) were also fabricated.

The AC voltage step-up test was carried out at a maximum permissible temperature and another temperature higher by +15° C. than it. The test result is shown in Table 1.

TABLE 1

|  | Max Permissible Temp. (° C.) | Max Permissible Temp. (° C.) +15° C. |
|---|---|---|
| Example I | 10/10 Safegard Mechanism Operation | 10/10 Safegard Mechanism Operation |
| Example II | 10/10 Safegard Mechanism Operation | 10/10 Safegard Mechanism Operation |
| Prior Art I | 10/10 Safegard Mechanism Operation | 4/10 Safegard Mechanism Operation |
| Prior Art II | 10/10 Safegard Mechanism Operation | 8/10 Safegard Mechanism Operation |

In the voltage step-up test, a voltage was boosted by 50 V for each 12 hours from the rated voltage under the maximum permissible temperature. When the electrostatic capacitance becomes approximately zero, it was judged that the safeguard mechanism had been operated. In this case, the safeguard mechanism was operated for all the capacitors according to the examples Nos. 1 and 2. Thus, no difference in the capacitor characteristic was not produced. Therefore, the same test was carried out at an environmental temperature increased by 15° C. from the maximum permissible temperature.

At the maximum permissible temperature plus 15° C., in all the samples according to the examples Nos. 1 and 2, the safeguard mechanism was operated whereas in the samples according to the prior art No. 1, six samples were broken and in the samples according to the prior art No. 2, two samples were broken. In the samples of the prior art No. 1, both the thick area (frame sprayed area) and the thin area (center area) were broken. In the sample of the prior art No. 2, only the thick area was broken. From this test result, it can be guessed that the breakage at the thick area (metal-frame spraying area) results from that the breakage at this area cannot be cleared because of higher energy required for clearing than the remaining area and hence the short-circuiting current continues to flow so that excessive heat was generated at the fuse areas, leading to dielectric breakdown. It can be also guessed that the breakage at the thin area (center area) results from that the short-circuiting current due to the clearing of minute breakage does not operate the fuse area and hence the breakage continues at the pertinent block so that the dielectric breakdown spreads toward the surrounding blocks, thus leading to breakdown of the capacitor itself.

On the other hand, it can be guessed that the capacitors according to sample Nos. 1 and 2 have not been broken for the reasons why the low resistance film area in contact wit the electrode lead-out portion 3, in which the area of the minute block is smaller than the remaining area, has improved the clearing of the minute breakage and the operability of the fuse area, thereby leading to the safeguard mechanism; and that the electrode partitioning lines formed at regular intervals in the longitudinal direction prevent the breakage at the minute block 8 from continuing to spread toward the surrounding blocks.

As regards the same samples, the self-recovery test described in JIS4908 was carried out. The test result was shown in Table 2.

TABLE 2

|  | Changing Rate of Electrostatic Capacitance ΔC/C (%) | |
| --- | --- | --- |
| Example I | −0.1 −0.2 −0.2 −0.3 −0.3 | X̄ = −0.22 |
| Example II | −0.1 −0.1 −0.1 −0.2 −0.2 | X̄ = −0.14 |
| Prior Art I | −0.5 −0.7 −0.7 −0.8 −1.0 | X̄ = −0.74 |
| Prior Art II | −0.3 −0.3 −0.4 −0.5 −0.6 | X̄ = −0.42 |

As seen from the table, the prior art sample No. 1 has indicated a larger changing rate of the electrostatic capacitance than in the examples Nos. 1 and 2. It can be guessed that this is because the prior art sample No. 1 has the divided electrode area larger than the minute block area, the fuse is fused by the short-circuiting current in self-recovery.

On the other hand, the prior art sample No. 2 has also indicated a larger reduction in the capacitance than the sample Nos. 1 and 2. It seems that this is because the current flowing from between the adjacent blocks in self-recovery of a certain block has operated the fusing area between the adjacent blocks which are not problematic. On the other hand, in the samples Nos. 1 and 2, the partitioning lines formed at regular intervals in the longitudinal direction of the film suppress the flowing current in the self-recovery to suppress the fusing operation of the minute block which is not problematic so that the meaningless reduction of the capacitance has been could be prevented.

Additionally, when the self-recovery has occurred at the low resistance film area 4 in contact with the electrode lead-out portion 3, because of large energy of the self-recovery, in almost all cases, the fuse was operated, thus leading to reduction of the capacitance. In the sample No. 2, considering this, in the low resistance area 4 abutting on the electrode lead-out portion 3, the minute blocks 8a, 8b are divided into more minute areas, thereby suppressing reduction of the capacitance.

Embodiment 2

Figure 6:
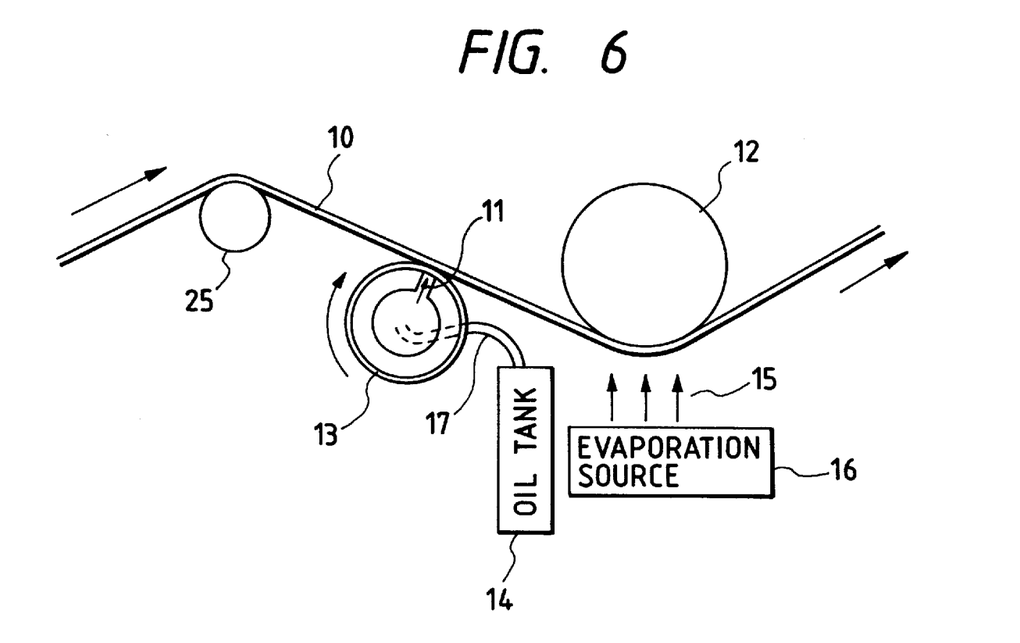
FIG. 6 is a view showing a device for fabricating a metallized film according to another embodiment according to the present invention.
Figure 7:
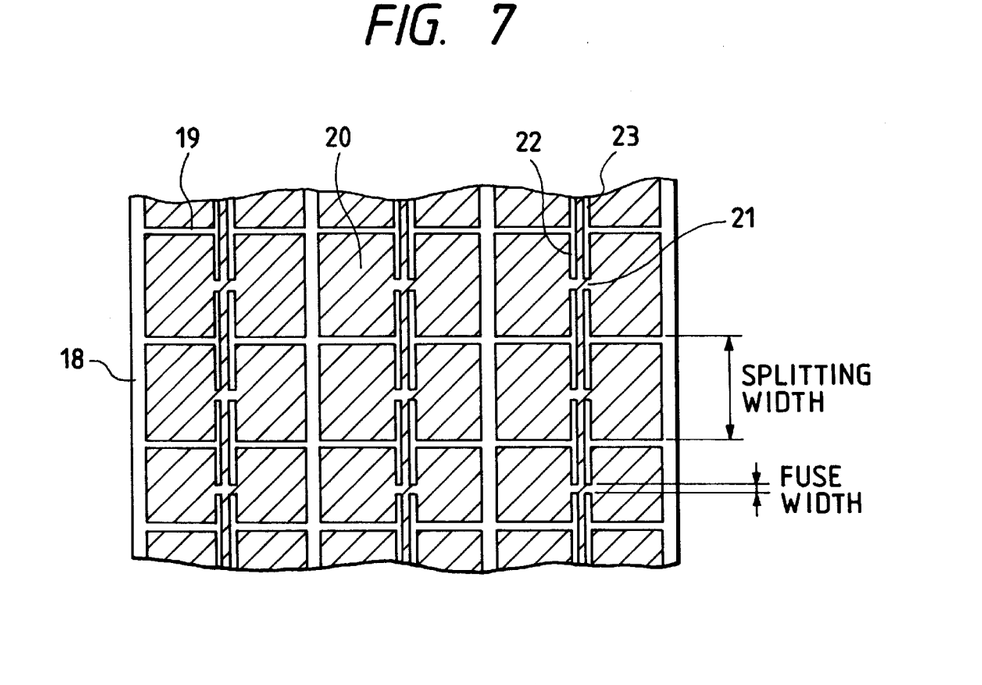
FIG. 7 is a view showing an example of a metallized film fabricated by the device.
Figure 8:
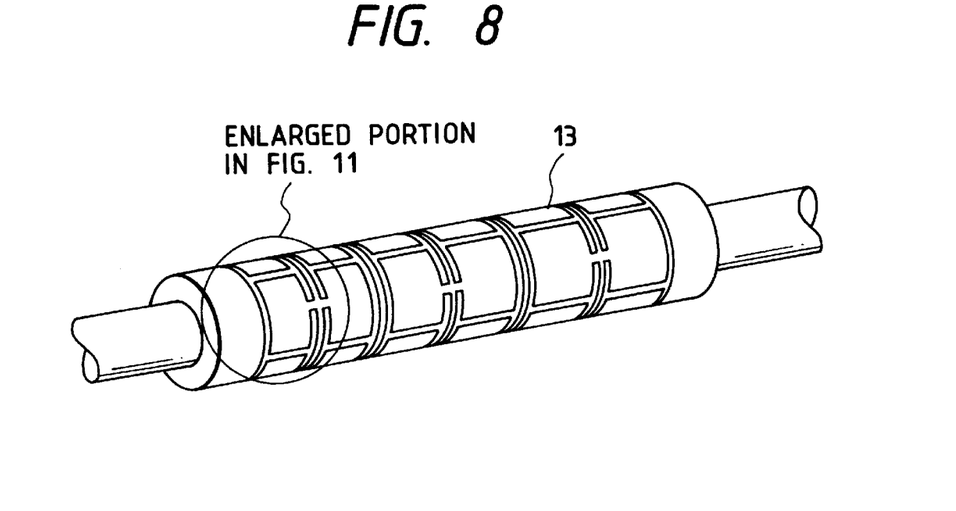
FIG. 8 is a view showing a screen cylinder used in the device.
Figure 9:
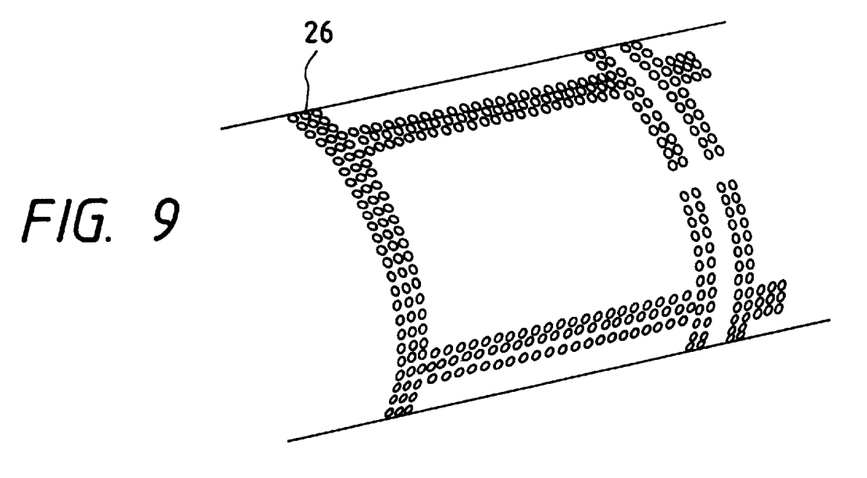
FIG. 9 is an enlarged view of a screen part of the cylinder.
Figure 10:
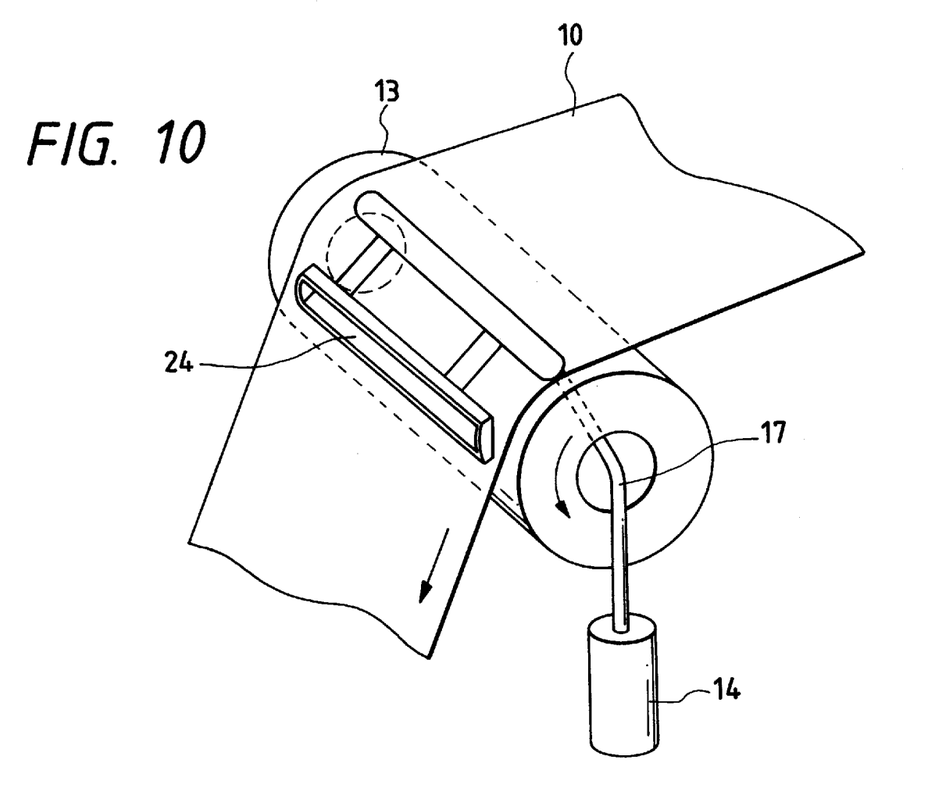
FIG. 10 is a view for explaining an internal conduit and an oil nozzle in the screen cylinder.

FIG. 6 is a view showing an apparatus for fabricating a metallized film according to one embodiment of the present invention. FIG. 7 is a view showing an example of the metallized film fabricated by the fabricating apparatus. FIG. 8 is a view showing a screen cylinder used in the apparatus. FIG. 9 is an enlarged view of a screen section thereof. FIG. 10 is a view explaining an inner conduit and oil nozzle of the screen cylinder. In these figures, reference numeral 10 denotes a plastic film; 11 denotes a vaporized oil gas which flows through a oil gas flow path from an oil tank 14 and is jet out from the inside of a screen cylinder 13 with a screen formed toward the plastic film 10. Reference numeral 16 denotes an evaporation source which heats metal to be evaporated and deposits the metal on the plastic film 10. Reference numeral 12 denotes a cooling roll; 24 an oil nozzle and 25 a supply roll; and 26 a pattern portion.

Reference numeral 18 denotes a margin; 19 a split margin; 20 an evaporated film (active portion); 21 a fuse area; 22 a window margin and 23 an evaporated film (heavy edge portion).

In a vacuum evaporator which can evaporate zinc in a heavy-edge shape on the one side of a polypropylene film having a thickness of 6 μm, a safe-guard pattern as shown in FIG. 7 is formed before the plastic film 10 supplied from the supply roll 25 passes the cooling roll 12. The typical pattern as shown in FIG. 7 is basically composed of minute areas into which the evaporated film is divided. A pattern portion made on the screen cylinder 13 must be mesh-shaped.

If the pattern portion 26 is not mesh-shaped but punched out, the margin 18 cannot be formed in the longitudinal direction of the film but formed by another technique. The pattern as shown in FIG. 7, in which only the fuse areas 21 serves as connecting portions, becomes weak in strength because the screen cylinder 13 rotates at a high speed. Further, the screen cylinder 13, which is used within the evaporator, must be cylindrical. The screen cylinder must not be plane-shaped to realize a continuous manner. Further, it must not be polygonal not so as to injure the plastic film.

The diameter of each of openings of the mesh pattern is preferably 10 μm to 1 mm. This is because when it is smaller than 10 μm, clogging is apt to occur whereas it exceeds 1 mm, the fusing accuracy will be deteriorated.

The oil gas 11 is heated and vaporized in the oil tank 14 outside the screen cylinder 13 and passes through the oil gas path 17 which is heated (heating portion is not shown). The oil gas while being vaporized is guided to the tip of the oil nozzle 24 which is an oil gas jetting inlet. Further, the oil gas passes through the patterned screen cylinder 13 from the tip of the oil nozzle 24 and deposited onto the plastic film 10. If the oil gas flow path is not heated, the oil gas 11 vaporized in the oil tank 14 is liquefied. To prevent this, the heating is carried out for the path to the oil nozzle 24.

The screen cylinder 13, oil nozzle 24, oil tank 14 and oil gas flow path are arranged as shown in FIG. 10. The width of the screen cylinder 13 is made larger than that of the plastic film 10 which is a base material. The width of the oil nozzle 24 is made equal to that of the screen cylinder 13. The end of the oil nozzle 24 has a shape along the curve of the inner wall of the screen cylinder 13 which is cylindrical. With the tip abutting on the inner wall of the screen cylinder 13, the deposition is carried out.

The plastic film 10 which is a base material, while it is partially made to abut on the cylindrical surface of the screen cylinder 13, is transferred. The screen cylinder 13 itself is also driven (the driving means is not shown) in synchronism with the plastic film 10. The is because if the deposition is carried out without driving the screen cylinder 13, the plastic film 10 will slip on the surface of the screen cylinder 13, thus making it impossible to assure the pattern accuracy and clearness.

Since the oil nozzle 24 is caused to abut on the inner wall of screen cylinder 13 on which the plastic film 10 abuts partially, the oil can be deposited surely, thus making the clear pattern.

In this embodiment, the deposition was carried out with the oil nozzle 24 abutting on the internal wall of the screen cylinder 13, according to the pattern to be formed, the presence of a slight gap is desired between the oil nozzle 24 and the internal wall of the screen cylinder. Therefore, the oil nozzle 24 preferably has gap adjusting means (not shown).

The safeguard mechanism pattern, as shown in FIG. 7, includes band-like margins 18 in a longitudinal direction of the film and split-margins 19 and fusing areas 21 which serve as safeguard mechanism in a metallized film capacitor.

In this embodiment, deposition was carried out at two speeds of 300 m/min and 600 m/min. In The metallized film pattern shown in FIG. 7, the width of the margins 18 was set at 4 mm, that of the split margins 19 and window margins 22 was set at 0.5 mm, and that of the fusing areas 21 was set at 0.8 mm. For comparison, the metallized film was also formed in attachment of a rotary shutter having a safeguard mechanism pattern (comparative example No. 1). Further, it was also formed in a manner of transferring oil using a pattern roll having protrusions attached in place of the screen cylinder (comparative example No. 2). For deposition of the Yheavy edge, the film resistance of the active area was set at 10–20 Ω/□ and that of the heavy edge area was set at 3–5 Ω/□.

TABLE 3

|  | 300 m/min. | | 600 m/min. | |
| --- | --- | --- | --- | --- |
|  | Split Margin | Window Margin | Split Margin | Window Margin |
| Embodiment of the Invention | ○ | ○ | ○ | ○ |
| Comparative Example 1 | X | X | X | X |
| Comparative Example 2 | ○ | ○ | X | X |

Table 3 shows the result of visual clearness of the split margins 19 and fusing areas 21 after deposition.

In this embodiment, the clear margins were recognized by the split margins 19 and fuse areas 21 even at a high speed of 600 m/min.

In this embodiment, the metallized film was formed without attaching the impression roll opposed to the screen cylinder 13 with respect the plastic film 10. The apparatus is preferably provided with an impression cylinder roll 36. The attachment of the impression roll 36 suppresses the fluctuation of the plastic film 10 and screen cylinder 13, thus providing the metallized film with high accuracy. Moving the plastic film 10 along the impression roll 36 also realizes the deposition at like accuracy. If the metallized film should be formed at a high accuracy, the plastic film 10 is preferably moved along the screen cylinder 13. Where it should be formed with an accuracy to a certain degree at a high speed, the plastic film is preferably moved along the impression cylinder roll 36.

Like the distance between the screen cylinder 13 and oil nozzle 24 as described above, according to the pattern, the distance adjusting means (not shown) which can form a gap between the screen cylinder 13 and the impression cylinder roll 36 is preferably provided. In either case, the provision of the gap is useful for the pattern which intends to diffuse the oil gas.

In the comparative example No. 1 of using the rotary shutter, the rotary shutter was deformed so that both the split margin areas 19 and the fuse areas could not be almost formed. The deformation of the rotary shutter is due to that the successive area (fuse area) is as thin as 0.8 mm and the thickness for realizing light weight and low cost was not assured sufficiently. In the comparative example No. 2 of using the protrusion, at the speed of 600 m/min, metal was partially deposited on the margin so that the metallized film could not have sufficient clearness. This is because the oil deposited on the tip of the protrusion is scattered due to high speed rotation so that a sufficient amount of oil could not transferred to the film.

In this embodiment, deposition of zinc on the one side was explained. But, the same result was obtained for the deposition of aluminum and alloy of aluminum-zinc, and for both side depositions thereof.

In this way, the above conventional problem can be solved by an apparatus and method for fabricating a metallized film using a vacuum evaporator or evaporation step of forming a metallized film for a metallized film capacitor in the following manner. Specifically, in order to prevent the evaporated metal from being partially deposited on the film, vaporized oil gas is previously deposited on the film. In deposition of the oil gas, any pattern is used which includes through-holes (mesh) passing from the surface of the screen cylinder 13 having a width larger than that of the plastic film which is a base material. While the screen cylinder 13 is rotated in synchronism with the deposition speed of oil, the vaporized oil is deposited on the plastic film 10 through the through-holes (mesh pattern). Immediately thereafter, the evaporated metal is deposited on the plastic film.

More specifically, in the evaporator for fabricating a metallized film for a capacitor provided with rolls arranged as shown in FIG. 6 and the screen cylinder 13 as shown in FIG. 8, the gaseous material for preventing evaporation of metal such as vaporized oil supplied from the oil tank 14 is passed through the screen cylinder 13 having any mesh pattern and deposited on the plastic film (dielectric film) 10, and thereafter the metal is deposited thereby making the split fuse patterns and margins having each having a fixed width formed at regular intervals. In addition, the impression roll for defining the path of the plastic film 10 is arranged oppositely to the screen cylinder 13 with respect to the plastic film 10. For these reasons, even when the oil deposition speed is enhanced, the plastic film 10 does not fluctuate and the distance between the plastic film 10 and the oil nozzle 24 (oil gas jetting opening), thereby maintaining clearness of the pattern. Further, the screen cylinder, which is light, can be easily exchanged. Since the margins are formed simultaneously with the fuse areas, the exchange itself can be easily adjusted. Thus, workability can be improved and the apparatus can be made economical.

As understood from the description hitherto made, in accordance with this embodiment, the split fuse pattern and the a margins in the longitudinal direction which serve as the safeguard mechanism for the metallized film, can be formed during high speed deposition. Thus, the metallized film with excellent safeguard and production can be obtained. The screen cylinder 13, which is lighter than the conventional oil nozzle 24, can be easily removed and attached, and is economical. Accordingly, the apparatus according to the present invention can have greater total merits than the conventional apparatus.

Additionally, the mesh may include machined through-holes or may be fabric.

As described above, in the metallized film capacitor according to the first aspect of the present invention, because of electrode partitioning lines formed at regular intervals in a longitudinal direction of a film, where minute breakage which cannot be cleared by self-recovery occurs in a plurality of minute blocks, reduction in capacitance resulting when the current flowing from between adjacent minute blocks operates the non-problematic fuse area between the blocks can be suppressed. Also where the fusing area does not operate because of the short-circuiting current due to clearing of minute breakage, breakage in the capacitor can be prevented which results from the breakage at the block continuing to lead to dielectric breakdown and to spread toward the surrounding blocks.

The metallized film according to the second aspect of the present invention, in addition to the first aspect, has improved the clearing of the minute broken area because the minute block in the low resistance film area abutting on the electrode lead-out portion has a smaller area than the other area, thereby improving the operability of the fuse area. For this reason, as regards the breakage which cannot be cleared when the evaporated film on the side of the frame sprayed area, the short-circuiting current continues to flow to prevent the dielectric breakage from occurring at the thick portion of the evaporated film.

The film capacitor according to the third aspect of the present invention, in addition to the second aspect, uses zinc or zinc/aluminum alloy as the evaporated metal. For this reason, using the metal characteristic of these metal which require larger energy to perform clearing in minute breakage than a single element of aluminum which is mainstream of the metallized film capacitor at present, higher potential or miniaturization of the metallized film capacitor can be realized than the aluminum evaporated capacitor.

As apparent from the description hitherto made, the fourth fabricating device for a metallized film according to the present invention deposits a vaporized metal evaporation preventing agent directly on film through a screen to a clear pattern on a margin at a high speed.

The fifth fabricating device for a metallized film can hold the strength of the screen to prevent the distortion when the screen is rotated.

The six fabricating device for a metallized film can from a pattern with no clogging accurately.

The seventh fabricating device for a metallized film can hold the vaporized state of a metal evaporation preventing agent until it reaches a film, thereby forming a clear pattern.

The eighth fabricating device for a metallized film makes the shifting speeds of a screen and a film synchronous with each other so that the displacement or blue of the pattern can be suppressed.

The ninth fabricating device for a metallized film, in which a screen is cylindrical, can easily the screen and will not injure the film.

The tenth fabricating device for a metallized film shifts the film along a cylindrical face so that the contact between a screen and a film can be held without using a specific means for holding the film.

The eleventh fabricating device for a metallized film can provide an optimum distance between a screen and a discharging opening of a metal evaporation preventing agent in accordance with the kind of oil to be used, shifting speed, kind of a pattern, etc.

The twelfth fabricating device for a metallized film can prevent the chattering of a film by an impression cylinder roll, thereby forming a pattern accurately.

The thirteenth fabricating device for a metallized film can shift a film along the impression cylinder roll so that the film is brought into contact with the impression roll, thereby keeping the distance between the screen and film.

The fourteenth fabricating device for a metallized film adjusts the distance between the impression cylinder roll and the screen so that the distance between the screen and the film can be adjusted.

The fifteenth fabricating device for a metallized film can form a split margin and fuse area with no succeeding step.

The method of fabricating a metallized film deposits the vaporized metal evaporation preventing agent directly on a film through a screen to a clear pattern on a margin at a high speed.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A metallized film capacitor, comprising:
    a plurality of metallized films, each of said metallized films including a dielectric film and a metal evaporated electrode formed on one or both sides of said dielectric film, wherein a pair of said metal evaporated electrodes are disposed opposite each other through said dielectric film by laminating or winding said metallized films to form a capacitor element; and
    a pair of electrode lead-out portions disposed on both ends of said capacitor element;
    wherein each of said metal evaporated electrodes has a lower resistance area abutting on the electrode lead-out portions and a remaining high resistance area having higher resistance than said lower resistance area;
    wherein at least one of said pair of metal evaporated electrodes has a split electrode pattern with a plurality of minute blocks formed in a longitudinal direction and width direction and with fusing areas between adjacent minute blocks; and
    wherein electrode partitioning lines are formed at regular intervals in a longitudinal direction of each of the metallized films.

2. A metallized film capacitor according to claim 1, wherein an area of each of the minute blocks in said lower resistance film area is smaller than that in the higher resistance area.

3. A metallized film capacitor according to claim 2, wherein each of the metal evaporated electrodes is made of zinc or zinc/aluminum alloy.

* * * * *

UNITED STATES PATENT AND TRADEMARK OFFICE
CERTIFICATE OF CORRECTION

PATENT NO. : 5,905,628
DATED : May 18, 1999
INVENTOR(S) : Okuno, et. al.

It is certified that error appears in the above-indentified patent and that said Letters Patent is hereby corrected as shown below:

On the Title page, item [75], line 3, delete "Tonami" and insert --Toyama--.
line 4, delete "Takaoka" and insert --Toyama--.
line 5, delete "Tonami" and insert --Toyama--.

Column 1, Line 59, delete "and-tape" and insert --and tape--.

Column 2, Line 62, delete "problem-occurs" and insert --problem occurs--.

Column 4, Line 21, after "invention", delete "," (comma).

Column 6, Line 44, after "2", delete "let".

Column 9, Table 2, delete all occurrences of "$\cancel{x}$" and insert --$\bar{X}$--.

Column 12, Line 31, after "the", delete "a".

Signed and Sealed this

Nineteenth Day of October, 1999

Attest:

Q. TODD DICKINSON

*Attesting Officer*    *Acting Commissioner of Patents and Trademarks*